(No Model.)
V. H. BECKER.
AMMONIA EVAPORATOR FOR REFRIGERATORS.
No. 337,363. Patented Mar. 9, 1886.
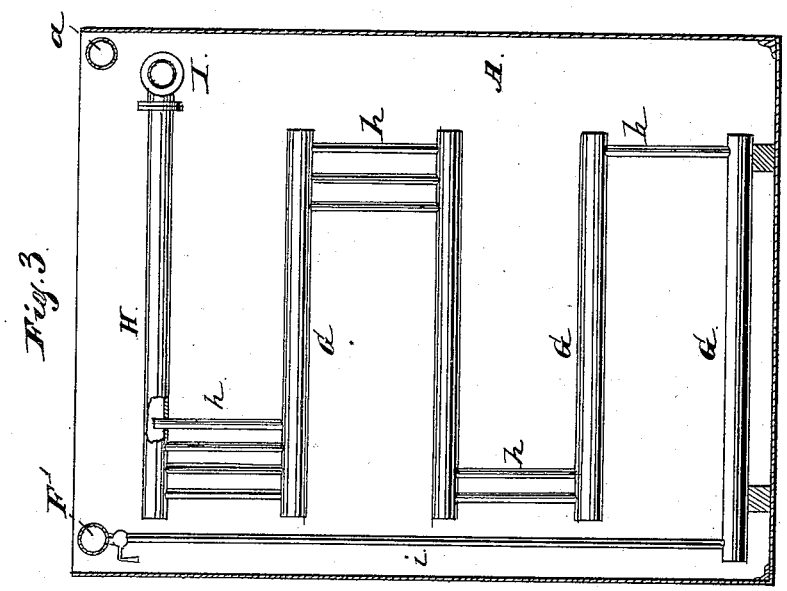
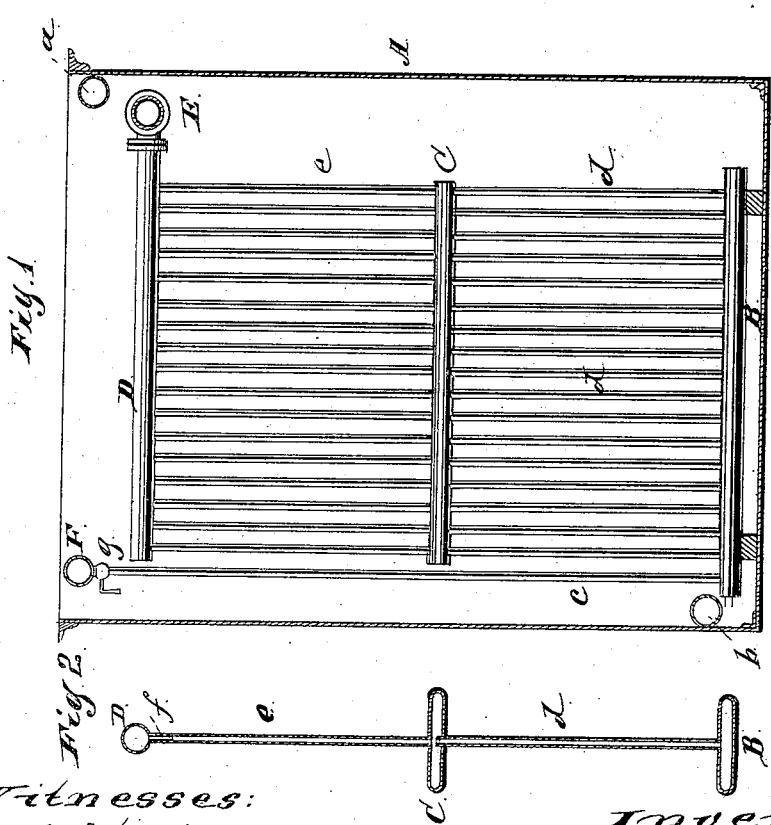
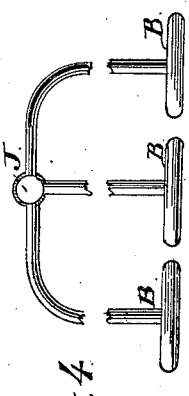
Witnesses:
Inventor:
Victor H. Becker

United States Patent Office.

VICTOR H. BECKER, OF CHICAGO, ILLINOIS.

AMMONIA-EVAPORATOR FOR REFRIGERATORS.

SPECIFICATION forming part of Letters Patent No. 337,363, dated March 9, 1886.

Application filed January 24, 1885. Serial No. 153,913. (No model.)

*To all whom it may concern:*

Be it known that I, VICTOR H. BECKER, residing at Chicago, in the county of Cook and State of Illinois, and a citizen of the United States, have invented a new and useful Improvement in Ammonia-Evaporators for Refrigerators, of which the following is a full description, reference being had to the accompanying drawings, in which—

Figure 1 is a side elevation, some parts being in section. Fig. 2 is a detail. Fig. 3 is a modification. Fig. 4 is a modification.

Heretofore it has been common in evaporating liquid ammonia in refrigerating-machines to introduce the liquid ammonia into a series of coils, the ammonia entering at the top, and being evaporated in its passage through the coils to the bottom, the coils being located in a brine-tank. This method of introducing ammonia at the top of the coils is not the best, for the reason that the brine near the top of the tank is warmer than that at the bottom, and the expansion of the gas should be completed in that part of the tank which is the warmest. Ammonia has been introduced at the lower end of an ordinary coil; but a portion of the coil becomes filled with the liquid, which prevents or greatly retards evaporation.

The object of my invention is to overcome this difficulty, which I accomplish by providing an evaporator with one or more large evaporating-chambers.

In the drawings, A represents the brine-tank. $a$ is the inlet for the brine, and $b$ the outlet.

B is a flattened evaporating-chamber closed at the ends, preferably similar in form to that shown in Fig. 2, and located near the bottom of the tank.

$c$ is a tube through which the liquid ammonia is introduced into B.

$d$ is a series of tubes secured at one end into the chamber B.

C is a second chamber, similar to B, into which the upper ends of the tubes $d$ are secured. The upper end of each one of these tubes $d$ extends up into C, as shown in Fig. 2.

$e$ is another series of tubes, similar to $d$, the lower ends of which are secured into C, while their upper ends are secured in a header, D. The interior of the upper end of each of the tubes $e$ is contracted by inserting a plug, $f$, therein or otherwise, to secure a uniform flow of the gas from these tubes to the header D.

The chambers B C and header D, together with the tubes $d$ $e$, take the place of a single coil ordinarily used in an evaporator; and as it is common to use a number of coils side by side in a tank, so I provide a number of these chambers, headers, and tubes arranged side by side in the tank.

E is a header placed at right angles to the headers D, and extending across the tank, with which header E the headers D communicate. F is also a header, extending across the tank into which the liquid ammonia is introduced, and from which it flows through the pipe $c$ to each one of the chambers B. A valve, $g$, may be provided to control the flow from the header F through each pipe $c$.

The operation is as follows: The liquid ammonia is introduced into the header F, from which it flows through the pipes $c$ to several chambers, B, where it spreads out in a thin sheet with a very large evaporating-surface. The evaporated ammonia passes up through the tubes $d$ into the chambers C, and if any of the liquid ammonia be carried up with the gas it will be trapped in C and there evaporated. The gas from the chambers C passes through the tubes $e$ into the headers D, and from the headers D the gas passes into the header E, from which it can be carried to any desired point, as usual.

The chambers C and tubes $e$ may be omitted entirely, if desired, the pipes $d$ extending then directly from the chamber B to the header D.

If desired, more than one chamber C may be located between the chamber B and header D, suitable short pipes passing from one to the other, as before described.

In Fig. 3 I have shown a modification consisting of a series of large chambers, G, connected with each other at one end by one or more short tubes, $h$, the upper ends of which tubes extend into the chamber to which they are secured, in order to trap any liquid ammonia which may be carried over. The pipes $h$ from the upper chamber G pass into a header, H. I provide a series of these chambers, pipes, and headers in each tank. The liquid ammonia is introduced into the lower one of the chambers G through a pipe, $i$, and the gas passes up through the tubes $h$ and remaining chambers G to the header H.

The several chambers G, headers H, and small pipes $h$ take the place of a single coil, as now used in evaporators, and I use as many of these side by side as may be desirable in a single tank.

F' is a header.

I is a header with which the headers H communicate.

With the devices shown in Fig. 3 I provide a very large evaporating-surface at comparatively small cost, and introduce the liquid ammonia at the bottom of the tank or coil, instead of at the top.

In Fig. 4 I have shown another modification, consisting of three chambers, B, a single header, J, with which the small pipes from the chambers B communicate.

What I claim as new, and desire to secure by Letters Patent, is—

1. In a refrigerating-machine, an evaporator consisting of two or more enlarged evaporating-chambers, one placed above the other and connected by small pipes which project into the upper chamber, and an outlet-header arranged above the upper chamber and connected thereto by pipes, substantially as described.

2. In a refrigerating-machine, the combination, with two or more enlarged evaporating-chambers arranged one above the other, of a series of small pipes connecting said chambers and projecting into the upper chamber or chambers, an outlet-header, and a series of pipes connecting it with the upper evaporating-chamber, said pipes being of contracted diameter at their upper ends, substantially as described.

VICTOR H. BECKER.

Witnesses:
E. A. WEST,
O. W. BOND.